(12) United States Patent
Lee et al.

(10) Patent No.: US 9,829,180 B2
(45) Date of Patent: Nov. 28, 2017

(54) DISPLAY APPARATUS

(71) Applicant: LG ELECTRONICS INC., Seoul (KR)

(72) Inventors: Kyungjoon Lee, Seoul (KR); Wondo Kee, Seoul (KR); Jihee Park, Seoul (KR); Woongjoon Hwang, Seoul (KR); Juyoung Joung, Seoul (KR)

(73) Assignee: LG ELECTRONICS INC., Seoul (KR)

(*) Notice: Subject to any disclaimer, the term of this patent is extended or adjusted under 35 U.S.C. 154(b) by 231 days.

(21) Appl. No.: 14/767,829

(22) PCT Filed: Feb. 14, 2013

(86) PCT No.: PCT/KR2013/001165
§ 371 (c)(1),
(2) Date: Aug. 13, 2015

(87) PCT Pub. No.: WO2014/126278
PCT Pub. Date: Aug. 21, 2014

(65) Prior Publication Data
US 2015/0369454 A1 Dec. 24, 2015

(51) Int. Cl.
*G09F 13/04* (2006.01)
*F21V 13/04* (2006.01)
(Continued)

(52) U.S. Cl.
CPC ............... *F21V 13/04* (2013.01); *F21K 9/62* (2016.08); *F21V 5/005* (2013.01);
(Continued)

(58) Field of Classification Search
CPC . F21V 13/04; F21V 5/005; F21K 9/62; G02F 1/133603; G02F 1/133605; G02F 1/133606
(Continued)

(56) References Cited

U.S. PATENT DOCUMENTS 6,607,286 B2 * 8/2003 West .................... F21V 5/04
257/E33.072
7,300,185 B1 * 11/2007 Ruffin .................... F21K 9/00
362/334
(Continued)

FOREIGN PATENT DOCUMENTS

JP 2008-216540 A 9/2008
KR 10-2006-0112071 A 10/2006
(Continued)

*Primary Examiner* — Bryon T Gyllstrom
(74) *Attorney, Agent, or Firm* — Dentons US LLP

(57) ABSTRACT

A display apparatus according to an embodiment of the present disclosure comprises: a substrate; a light-emitting unit including a light emitting element mounted on the substrate and a lens placed above the light-emitting element; a reflective layer placed on the upper surface of the substrate; an optical sheet placed above the reflective layer and placed at a height at which the optical sheet is spaced from the light-emitting unit; and a display panel placed on the upper surface of the optical sheet, wherein the lens has a cutout portion formed therein by depressing a part of the side surface thereof toward the center thereof, thereby providing an anisotropic light distribution.

12 Claims, 3 Drawing Sheets

(51) Int. Cl.
  *G02F 1/1335* (2006.01)
  *F21V 5/00* (2015.01)
  *F21K 9/62* (2016.01)

(52) U.S. Cl.
  CPC .. *G02F 1/133603* (2013.01); *G02F 1/133605* (2013.01); *G02F 1/133606* (2013.01); *G02F 2001/133607* (2013.01)

(58) Field of Classification Search
  USPC ........................................................ 362/97.1
  See application file for complete search history.

(56) References Cited

U.S. PATENT DOCUMENTS

| | | | | |
|---|---|---|---|---|
| 7,348,723 | B2 * | 3/2008 | Yamaguchi | G02B 3/04 257/E33.073 |
| 8,172,433 | B2 * | 5/2012 | Muschaweck | G02B 27/0927 362/311.1 |
| 9,638,852 | B2 * | 5/2017 | Sakai | G02B 6/0011 |
| 2006/0034097 | A1 * | 2/2006 | Hahm | H01L 33/58 362/555 |
| 2007/0146573 | A1 | 6/2007 | Yang et al. | |
| 2008/0101063 | A1 * | 5/2008 | Koike | F21S 8/088 362/231 |
| 2008/0303757 | A1 | 12/2008 | Ohkawa et al. | |
| 2010/0259706 | A1 * | 10/2010 | Kuwaharada | F21V 5/04 349/62 |
| 2010/0328940 | A1 * | 12/2010 | Huang | F21S 8/086 362/235 |
| 2011/0019400 | A1 * | 1/2011 | Huang | F21V 5/04 362/235 |
| 2011/0199670 | A1 | 8/2011 | Chen | |
| 2012/0014115 | A1 * | 1/2012 | Park | G02B 27/0955 362/311.02 |
| 2012/0113621 | A1 * | 5/2012 | Lee | H01L 33/54 362/97.1 |

FOREIGN PATENT DOCUMENTS

| | | |
|---|---|---|
| KR | 10-2007-0117689 A | 12/2007 |
| KR | 10-2012-0005765 A | 1/2012 |

\* cited by examiner

[Fig. 1]
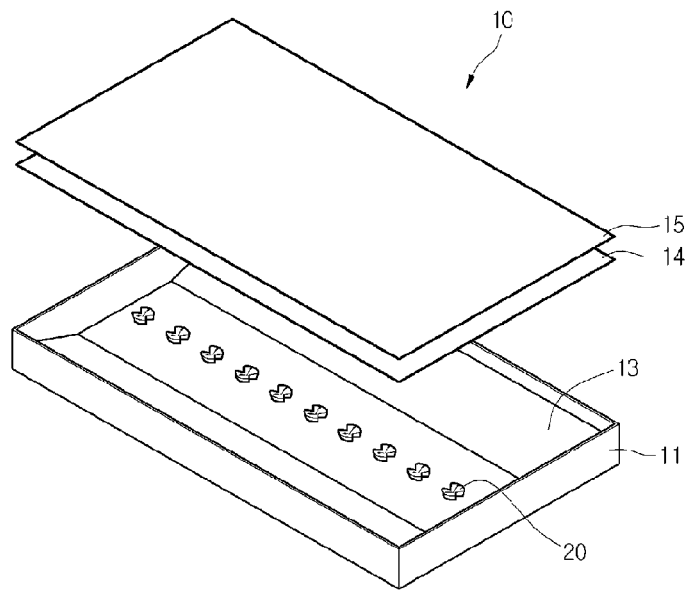
[Fig. 2]
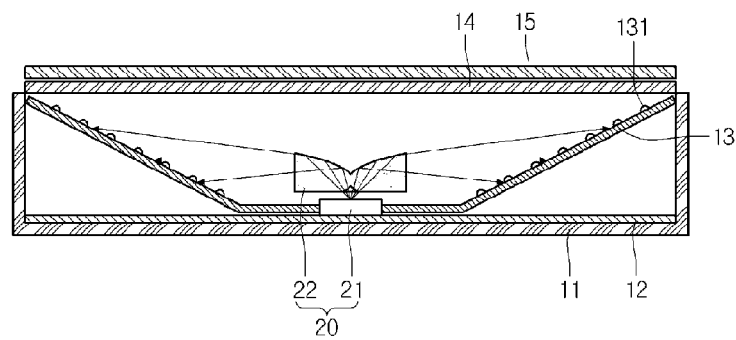
[Fig. 3]
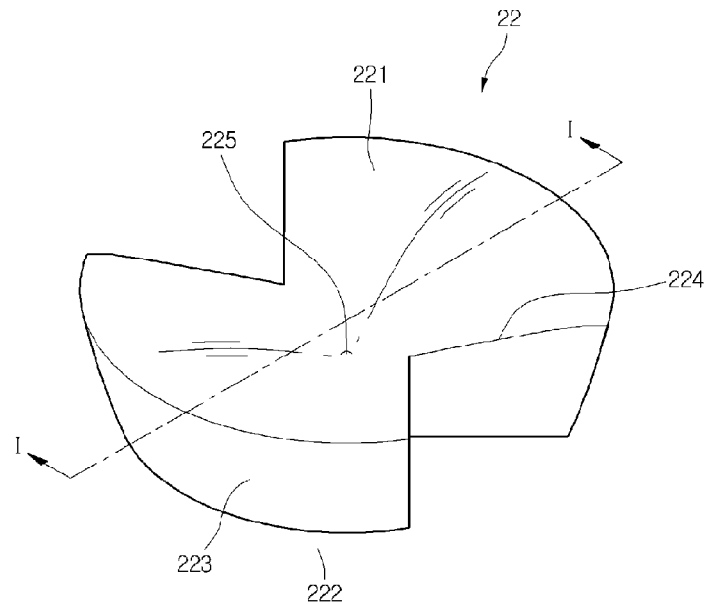

[Fig. 4]
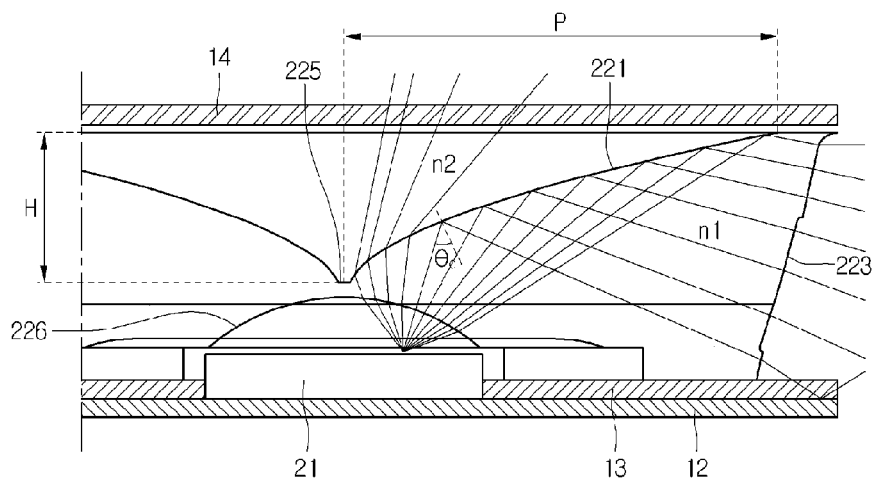
[Fig. 5]
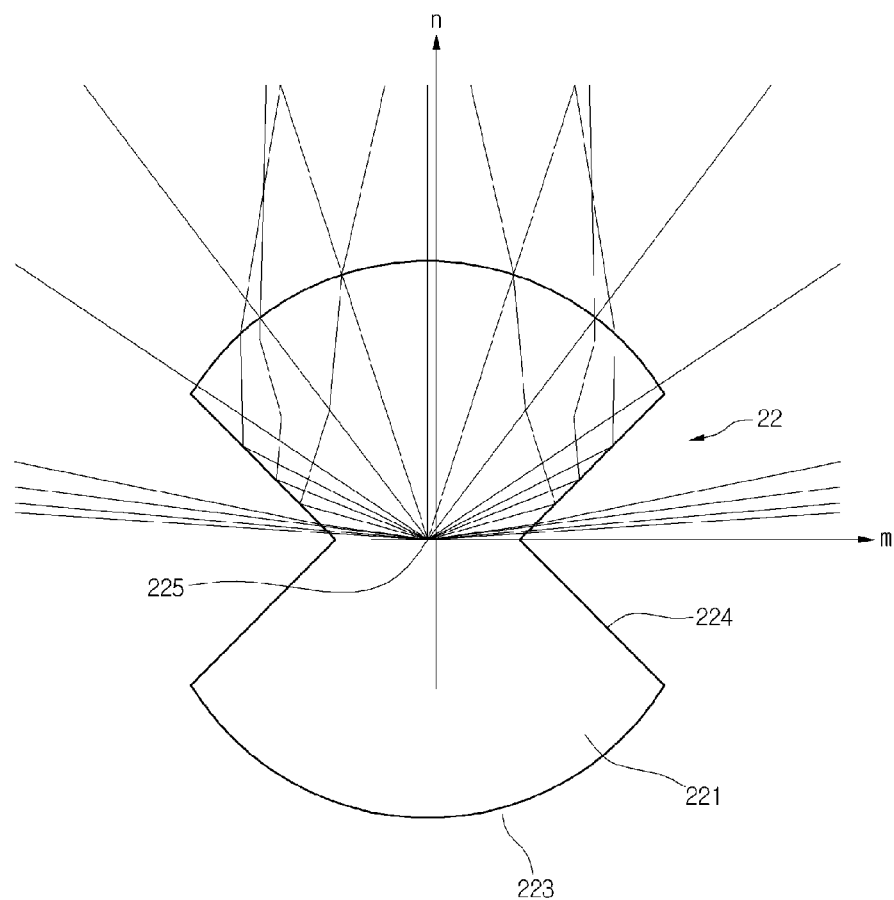

[Fig. 6]
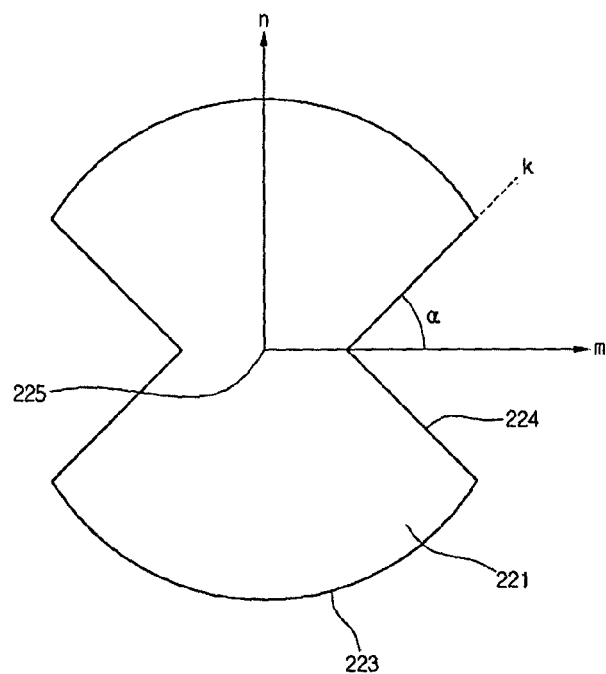
[Fig. 7]
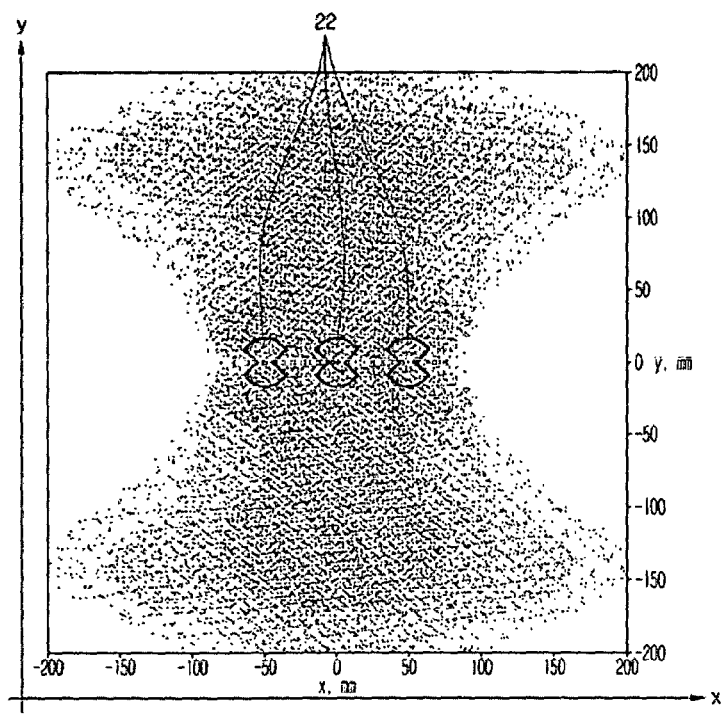

DISPLAY APPARATUS

This application is a U.S. National Phase Application under 35 U.S.C. §371 of International Application PCT/KR2013/001165, filed on Feb. 14, 2013, which is hereby incorporated by reference in its entirety.

TECHNICAL FIELD

The present disclosure relates to a display apparatus.

BACKGROUND ART

As the information society is developed, demands for the display devices have been increased in a variety of forms. To meet the demands, recently, various display devices such as liquid crystal display (LCD) devices, plasma display panel (PDP) devices, electroluminescent display (ELD) devices, vacuum fluorescent display (VFD) devices, or the like have been studied and used.

The liquid crystal panel of the LCD device thereof includes a liquid crystal layer, and a thin film transistor (TFT) substrate and a color filter substrate, which are facing each other by interposition of the liquid crystal layer. Since the liquid crystal panel of the LCD device is not self-emissive, the liquid crystal panel of the LCD device may display an image using light provided from a backlight unit.

The conventional backlight unit using an isotropic lens has a structure in which light sources are orthogonally arranged or arranged in a beehive structure, and the lens spreads light emitted from the light sources in an isotropic light distribution. In the above-described structure, since a pitch between the light sources increases as the number of the light sources decreases, there is a disadvantage that it is difficult to spread away the light in an isotropic light distribution of a circular shape using a secondary lens.

DISCLOSURE

Technical Problem

The present disclosure is directed to providing a display apparatus including an optical assembly capable of improving quality of a display image.

Specifically, the present disclosure is directed to providing a display apparatus capable of reducing the number of light sources and achieving a uniform surface light source structure through an anisotropic light distribution.

Technical Solution

One aspect of the present disclosure provides a display apparatus including: a substrate; a light-emitting unit including a light-emitting element mounted on the substrate and a lens placed on an upper side of the light-emitting element; a reflective layer placed on an upper surface of the substrate; an optical sheet placed on an upper side of the reflective layer and placed at a height at which the optical sheet is spaced apart from the light-emitting unit; and a display panel placed on an upper surface of the optical sheet, and the lens has a cutout portion formed therein by recessing a part of a side surface thereof toward a center thereof, thereby providing an anisotropic light distribution.

Advantageous Effects

According to the embodiment of the present disclosure, it is possible to reduce a thickness of a backlight unit and accordingly improve an exterior of a display apparatus including the backlight unit.

Further, as a structure of a lens which totally reflects light emitted from a light-emitting element toward a lower side is applied to a light source provided in the backlight unit, it is possible to improve the light efficiency and the illumination uniformity and accordingly improve quality of an image displayed on the display apparatus.

Further, as a lens having an anisotropic light distribution is applied to a light-emitting diode (LED) package of a top-view method, light emitted from a light source is totally reflected in parallel as much as possible. Thus, there is an advantage that the light is spread away. Therefore, there is an advantage that the light efficiency and the illumination uniformity uniformly remain even when the number of the light sources is reduced.

Further, as it is designed that a part of a reflective layer provided on a bottom portion of the backlight unit is inclined, light emitted from a light source is reflected toward a display panel as much as possible. Thus, there is an advantage that the light efficiency is improved.

Further, a member corresponding to a separate light-guiding layer is not required and thus a weight of the backlight unit can be reduced. As a result, it is possible to reduce a weight of the display apparatus.

DESCRIPTION OF DRAWINGS

FIG. 1 is an exploded perspective view illustrating a structure of a display apparatus according to an embodiment of the present disclosure.

FIG. 2 is a cross-sectional view of the display apparatus.

FIG. 3 is a perspective view of an exterior of a light-emitting unit according to an embodiment of the present disclosure.

FIG. 4 is a longitudinal-sectional view taken along line I-I of FIG. 3.

FIG. 5 is a plan view illustrating a form in which light is reflected and refracted through a lens according to an embodiment of the present disclosure.

FIG. 6 is a diagram for describing a forming condition of a cutout portion for achieving an anisotropic light distribution of the lens according to an embodiment of the present disclosure.

FIG. 7 is a diagram illustrating a simulation of a light distribution implemented by a light-emitting unit assembly to which a structure of the lens according to an embodiment of the present disclosure is applied.

MODES OF THE INVENTION

Hereinafter, the invention will be described with reference to accompanying drawings. Hereinafter, embodiments of the invention can be modified to various forms, and the scope of the embodiments is not limited to the embodiments to be described below. The embodiments of the invention are provided in order to fully explain the invention for those skilled in the art. Therefore, shapes and sizes of the elements in the drawings may be exaggerated for a more precise description.

FIG. 1 is an exploded perspective view illustrating a structure of a display apparatus according to an embodiment of the present disclosure. FIG. 2 is a cross-sectional view of the display apparatus.

Referring to FIGS. 1 and 2, a display apparatus 10 according to an embodiment of the present disclosure includes a display panel 15 which displays an image, a backlight unit which is provided behind the display panel 15 and emits light toward the display panel 15, and an optical sheet 14 which diffuses and processes light emitted from the backlight unit.

Specifically, the optical sheet 14 includes a diffusion sheet and a prism sheet. The backlight unit may include a light-emitting diode (LED) as a light source and use a top-view method in which the light emitted from the light source is directed toward the display panel 15.

The backlight unit includes a substrate layer 12 placed on a bottom of a panel case 11, light-emitting units 20 mounted on the substrate layer 12, and a reflective layer 13 placed on an upper surface of the substrate layer 12.

Specifically, the light-emitting units 20 may be arranged on a center portion of the reflective layer 13 at a predetermined interval in a line. Parts of the reflective layer 13 corresponding to both side areas of the light-emitting units 20 may form inclined surfaces which are inclined toward an upper side thereof. As the parts of the reflective layer 13 are formed to be inclined, light, which is emitted from the light-emitting unit 20 and refracted to the reflective layer 13, is reflected toward the optical sheet 14, and thus the light efficiency may be improved. A reflection pattern or a light extraction pattern 131 may be formed on an upper surface of the reflective layer 13, and the light emitted from the light-emitting unit 20 may be bumped to the pattern to be reflected toward the display panel 15.

The substrate layer 12 may be a printed circuit board (PCB) substrate formed using polyethylene terephthalate, glass, polycarbonate, silicon, or the like, and may be provided in a film form.

Meanwhile, the light-emitting unit 20 includes a light-emitting element 21 including an LED, and a lens 22 coupled to an upper side of the light-emitting element 21. The light-emitting element 21 may be an LED package using a top-view method, in which a light-emitting surface is formed toward the upper side thereof, and may emit light toward an upper side thereof with an oriented angle of about 120 degrees. Most of the light emitted from the light-emitting element 21 is totally reflected by the lens 22 toward a side thereof. Therefore, the lens 22 is provided on the upper side of the light-emitting element 21, and thus, a thickness of the backlight unit may be reduced and the light efficiency and the illumination uniformity may be improved.

Further, a light-guiding layer may be formed between the reflective layer 13 and the optical sheet 14 and the light-guiding layer may be filled with air or may remain in a vacuum state.

Hereinafter, a configuration of the light-emitting unit according to the embodiment of the present disclosure will be described in detail.

FIG. 3 is a perspective view of an exterior of the light-emitting unit according to the embodiment of the present disclosure. FIG. 4 is a longitudinal-sectional view taken along line I-I of FIG. 3.

Referring to FIGS. 3 and 4, the light-emitting unit 20 according to the embodiment of the present disclosure includes the light-emitting element 21 and the lens 22 provided on the upper side of the light-emitting element 21. As described above, the light-emitting element 21 includes the LED package and the LED package includes a sub-mount substrate and an LED element mounted on the sub-mount substrate. The sub-mount substrate is a transparent material and may be a transparent polymer material including glass, transparent ceramic, or a resin.

Specifically, the lens 22 may be formed in an aspheric shape, in which a light-emitting surface has a parabolic shape, so as to induce the total reflection of the light emitted from the light-emitting element 21 and transmit the light toward a side thereof.

More specifically, the lens 22 includes an upper surface portion 221, a lower surface portion 222, a side surface portion 223, and a cutout portion 224 formed by cutting a part of the side surface portion toward a center thereof.

Specifically, the upper surface portion 221 of the lens 22 is curved at a predetermined curvature and has an aspheric shape. As an example, the upper surface portion 221 of the lens 22 may be formed in a parabolic shape. A center portion 225 of the lens 22 is formed in a shape which is recessed at a very close distance from the upper side of the light-emitting element 220.

Further, a bottom center portion 226 may be formed on a center of the lower surface portion 222 of the lens 22, and the bottom center portion 226 may serve to reduce a yellowish phenomenon of an upper surface of the lens by spreading the light emitted from the light-emitting element 21 to be incident on the upper surface portion 221 of the lens 22. A cross section of the bottom center portion 226 may have various shapes such as a half circle shape, an oval shape, and an inclined straight line shape. As an experimental result, when the shape of the bottom center portion 226 is a round curved shape, it may be seen that a hot spot, which is one point on which the light is focused may be minimized, and the light is incident on the upper surface portion 221 of the lens 22 while the light is widely spread. Also, the bottom center portion 226 may be an air layer, and as another embodiment, it is possible to insert a separate lens to the bottom center portion 226. The separate lens may be molded into the light-emitting element 21 as a resin in which phosphors are mixed.

Meanwhile, the upper surface portion 221 of the lens 22 may serve to totally reflect the light, which is emitted from the light-emitting element 21 toward an upper side thereof, toward a side thereof. A total reflection angle $\theta_c$ is defined by the Snell's law as follows.

$\sin \theta_c = (n2/n1)$, where n1 is a refractive index of a lens and n2 is a refractive index of air.

Since a refractive index of polycarbonate is about 1.58, it is appropriate that a critical angle $\theta_c$ for the total reflection is about 42 degrees when the polycarbonate is used as a material of the lens 22. Therefore, it is preferable that a curvature of the upper surface portion 221 is provided so that an incidence angle of light incident on the upper surface portion 221 is 42 degrees or more. Then, most of the light incident on the upper surface portion 221 of the lens 22 is totally reflected to be diffused inside the light-guiding layer, and only some of the light passes through the lens 22 to move toward the display panel 15. Here, a light-shielding pattern layer is formed on the upper surface of the lens 22 and thus some of light proceeding toward the display panel 15 may be re-reflected to the light-guiding layer.

Meanwhile, the center portion 225 of the lens 22 may be recessed at a very close distance from the bottom center portion 226. A degree of spreading of the light incident on the lens 22 is determined by a depth H of the center portion 225 of the lens 22/a pitch P of the upper surface portion 221 of the lens 22. The pitch of the upper surface portion of the lens refers to a distance from the center portion 225 of the lens 22 to an edge at which a curved surface of the upper surface portion of the lens 22 ends. Hereinafter, a value of the H/P which refers to the degree of the spreading of the light incident on the lens 22 is defined as a luminous intensity distribution of the lens. The total reflection of the light is increased as a value of the luminous intensity distribution is increased, and thus the light is uniformly spread away.

As an experimental result, it may be seen that while the hot spot is reduced and loss of light is reduced as the value of the luminous intensity distribution is increased, the hot spot is increased and the loss of light is increased as the value of the luminous intensity distribution is reduced. Since the loss of light is rapidly increased when the luminous intensity distribution is less than 0.3, it is preferable that the luminous intensity distribution is 0.3 or more, and more preferably, about 0.5.

FIG. 5 is a plan view illustrating a form in which light is reflected and refracted through the lens according to the embodiment of the present disclosure.

Referring to FIG. 5, the cutout portion 224 recessed toward a center thereof is formed in the side surface portion of the lens 22 according to the embodiment of the present disclosure. The cutout portion 224 may have a structure in which side surface portions of a conventional isotropic optical lens are cut.

As illustrated above, light, which is emitted from the light-emitting element 21 and is incident on the lens 22, is incident on the upper surface portion 221 and side surface portion 223 of the lens 22. Therefore, most of the light incident on the cutout portion 224 among the light incident on the lens 22 is totally reflected.

Specifically, in a top view of the lens 22, some of the light incident on the side surface portion of the cutout portion 224 passes through and is transmitted in a horizontal direction, and most of the remaining light is totally reflected and spread toward the round side surface portion in a vertical direction (+n-axis and −n-axis directions). The +n-axis and −n-axis directions may be defined as a width direction of the display panel. A light distribution, in which light meets air containing a different medium to be refracted and diffused in a circular sector shape, is formed on an end portion of the lens 22 in the n-axis direction. Since the end portion of the n-axis direction forms a side surface portion which is rounded at a predetermined curvature, the light is widely spread by refraction while the light passes through the end portion of the lens.

As described above, as a part of the lens 22 has a shape which is cut so as to have an anisotropic light distribution, the light emitted from the light-emitting element 21 is not isotropically spread, but may be focused in one axis (n-axis) direction to be spread away. As a result, even when the number of the light-emitting elements 21 is reduced in the display panel of the same size, there is an advantage that the light efficiency is not reduced.

It is illustrated that the cutout surface of the cutout portion 224 has a straight line shape in the drawing, but is not limited thereto. The cutout surface may be formed in a round shape at a predetermined curvature. To this end, since it is necessary to adjust a distance in which light is spread according to a size of the display panel, the shape may be appropriately selected in the design process. As an example, the cutout surface of the cutout portion 224 is formed to be round, and thus the overall shape is formed in a peanut shape or an "8" shape in a top view.

Here, the amount of the light which is totally reflected by the cutout portion 224 may be changed according to an inclination of the cutout surface which forms the cutout portion 224 or a curvature. Hereinafter, a condition of forming the cutout portion 224 for increasing total reflectivity will be described.

FIG. 6 is a diagram for describing a forming condition of the cutout portion for achieving an anisotropic light distribution of the lens according to an embodiment of the present disclosure.

Referring to FIG. 6, a structure of the cutout portion of the lens for achieving an anisotropic light distribution in which the light emitted from the light-emitting element 21 is focused in one axis direction and spread away rather than an isotropic light distribution in which the light is radially spread with respect to a vertical axis in a horizontal direction is illustrated.

As illustrated in FIG. 5, as the cutout portion 224 recessed at a predetermined depth is formed on the side of the lens 22, the light is not spread in all directions but is substantially symmetrically spread in a single axis direction.

Specifically, in the drawing, it is important that the light incident on the cutout portion 224 is transmitted in an m-axis direction not to be spread, and is totally reflected as much as possible to be reflected in an n-axis direction. That is, as the light is totally reflected in the n-axis direction, the light may be spread away in a single axis direction. Thus, as illustrated in FIG. 1, even when the light-emitting units are arranged at a predetermined interval only in a longitudinal direction without arranging the light-emitting units in a horizontal direction of the backlight unit, the same light efficiency may be obtained. As a result, there is an advantage that the number of the light-emitting units installed on the backlight unit is reduced.

The amount of the light which is totally reflected by the cutout surface is determined according to the inclination of the cutout surface of the cutout portion 224. Although it is illustrated that the cutout surface is an inclined surface of a straight line shape in the drawing, the cutout surface may be formed in an inclined curved surface of a round curve shape. That is, as described above, it is possible to form the lens in a plane structure of a peanut shape or an "8" shape. In order to maximize the amount of the total reflection of the light under this condition, it is preferable that a part in which an angle formed by an axis (m-axis) passing through the center portion 225 of the lens and a center portion of the cutout portion 226 and a tangent line passing through any point of the cutout surface satisfies a range of 30 degrees to 60 degrees is 50% or more of a length of the cutout surface.

Meanwhile, as illustrated in FIG. 4, it is illustrated that the side surface portion 223 of the lens 22 is formed to have an acute angle with a horizontal plane, but is not limited thereto. That is, in order to adjust the light distribution, it is possible to adjust an angle formed by the side surface portion 223 of the lens 22 and the horizontal plane so as to be a right angle or an obtuse angle.

FIG. 7 is a diagram illustrating a simulation of a light distribution implemented by a light-emitting unit assembly to which a structure of the lens according to the embodiment of the present disclosure is applied.

Referring to FIG. 7, the simulation illustrates a light distribution in which three light-emitting units are arranged at an interval of 60 mm in a longitudinal direction of the display panel and an optical gap of the backlight unit is 20 mm. Here, the optical gap refers to a straight linear distance from the light-emitting unit 20 to the optical sheet 14. A thickness of the backlight unit may be substantially determined by the optical gap.

In the drawing, an x-axis refers to a longitudinal direction of the display panel and a y-axis refers to a width direction of the display panel. That is, a part of a smaller length is the width direction, a part of a greater length is the longitudinal direction, and the three light-emitting units 20 are arranged in the longitudinal direction in FIG. 1.

As it may be seen from the simulation result, when the plurality of light-emitting units 20 are arranged at a predetermined interval, it may be seen that light is diffused in a direction parallel to the display panel in each of the light-emitting units 20, a light distribution distance is reduced in a part in which the cutout portion is formed, the light is spread away toward other parts, that is, the round side surface portion. It may be seen that the light diffused in each of the light-emitting units 20 partially interferes and thus the brightness of the light almost uniformly remains in the inner part except for both edges.

Specifically, it may be seen that the light emitted through the side surface portion of the lens in one light-emitting unit is spread to a distance corresponding to a width of the display panel. However, since the light is not refracted and transmitted in the part in which the cutout portion is formed and most of the light is totally reflected, a gap area, in which light is ineffectively spread, may be generated in an area of the cutout portion. Therefore, in order to minimize the gap area, it may be designed that a distance between adjacent light-emitting units may be appropriately adjusted and a light distribution area partially overlaps. Of course, as the optical sheet 14 is placed in the gap area generated in the area of the cutout portion, the brightness is uniformly adjusted over the entire display panel and a surface light emission is implemented. That is, since some of light emitted to the optical sheet 14 is re-reflected and moved again toward the reflective layer 13, such a gap area may be removed.

According to the above-described structure, the number of the arranged light-emitting units may be determined according to a length of the display panel and a specification of the light-emitting element or a spread angle α of the cutout portion may be determined according to a length of the width of the display panel.

The invention claimed is:

1. A display apparatus comprising:
   a substrate;
   a light-emitting unit including a light-emitting element mounted on the substrate and a lens placed on an upper side of the light-emitting element;
   a reflective layer placed on an upper surface of the substrate;
   an optical sheet placed on an upper side of the reflective layer and placed at a height spaced apart from the light-emitting unit; and
   a display panel placed on an upper surface of the optical sheet,
   wherein the lens has a cutout portion formed therein by recessing a part of a side surface thereof toward a center thereof, thereby providing an anisotropic light distribution,
   wherein the cutout portion is formed in a shape which is gradually enlarged from the center portion of the lens to the edge thereof.

2. The display apparatus of claim 1, wherein an upper surface portion of the lens has an aspheric shape which is curved at a predetermined curvature from a center portion thereof to an edge thereof, and wherein a center of the upper surface portion of the lens is recessed, lower than the edge thereof.

3. The display apparatus of claim 2, wherein the upper surface portion of the lens has a parabolic shape, and the parabolic-shaped upper surface portion is uniformly formed in a circumferential direction of the lens except for an area of the cutout portion.

4. The display apparatus of claim 1, wherein a cutout surface of the cutout portion is formed in a shape of a plane or curved surface.

5. The display apparatus of claim 4, wherein an angle formed by a straight line passing through the center portion of the lens and a center of the cutout portion and a tangent line passing any point of the cutout surface is within a range of 30 degrees to 60 degrees.

6. The display apparatus of claim 5, wherein length of a part of the cutout surface which is within the range of 30 degrees to 60 degrees is 50% or more of a total length of the cutout surface.

7. The display apparatus of claim 1, further comprising a bottom center portion formed by recessing upwardly from a bottom center portion of the lens.

8. The display apparatus of claim 7, wherein, when H refers to a vertical distance from the center portion of the upper surface of the lens to the edge of the upper surface thereof and P refers to a horizontal distance from the center of the lens to a point at which an upper round portion of the lens ends, $0.3 \leq H/P \leq 0.5$.

9. The display apparatus of claim 7, wherein a longitudinal section of the bottom center portion has any one shape of a circular shape, an oval shape, and an inclined straight line shape.

10. The display apparatus of claim 7, wherein the upper surface portion of the lens is rounded at a curvature which makes an incidence angle of incident light be 42 degrees or more.

11. The display apparatus of claim 7, wherein the cutout portion is recessed in a shape which is symmetric with respect to a straight line passing through a center of the lens and extending outwards.

12. The display apparatus of claim 7, wherein at least a part of the reflective layer is formed to be upwardly inclined towards an edge thereof.

* * * * *